(12) United States Patent
Gerber

(10) Patent No.: US 7,658,067 B2
(45) Date of Patent: Feb. 9, 2010

(54) TUNABLE WAVE ENERGY CONVERTER

(75) Inventor: James S. Gerber, St. Paul, MN (US)

(73) Assignee: Ocean Power Technologies, Inc., Pennington, NJ (US)

(*) Notice: Subject to any disclaimer, the term of this patent is extended or adjusted under 35 U.S.C. 154(b) by 304 days.

(21) Appl. No.: 11/605,504

(22) Filed: Nov. 28, 2006

(65) Prior Publication Data

US 2007/0068153 A1    Mar. 29, 2007

Related U.S. Application Data

(63) Continuation-in-part of application No. 10/762,800, filed on Jan. 22, 2004, now Pat. No. 7,140,180.

(60) Provisional application No. 60/441,660, filed on Jan. 22, 2003.

(51) Int. Cl.
    *F03C 1/00*    (2006.01)

(52) U.S. Cl. ......................................... 60/496; 60/497

(58) Field of Classification Search ............. 60/495–497
    See application file for complete search history.

(56) References Cited

U.S. PATENT DOCUMENTS

| 3,696,251 | A | * | 10/1972 | Last et al. ..................... 290/53 |
| 4,110,630 | A | * | 8/1978 | Hendel ......................... 290/53 |
| 4,248,044 | A | * | 2/1981 | Woodilla ...................... 60/398 |
| 5,552,657 | A | * | 9/1996 | Epstein et al. ................ 310/339 |
| 7,140,180 | B2 | * | 11/2006 | Gerber et al. ................. 60/496 |
| 7,148,583 | B1 | * | 12/2006 | Shau et al. .................. 290/1 R |

* cited by examiner

*Primary Examiner*—Hoang M Nguyen
(74) *Attorney, Agent, or Firm*—Henry I. Schanzer

(57) ABSTRACT

In a wave energy converter (WEC) for capturing energy contained in surface waves on large bodies of water, one or both of the floats used in the WEC has an internal spring system including a weight suspended from a spring mechanism having a selectively variable spring constant for allowing vertical oscillations of the weight in response to bobbing motions of the float The mechanical impedance of the system is a function of the oscillations of the weight, hence the system is tunable to selected values of mechanical impedance for optimal coupling with the prevailing waves.

6 Claims, 3 Drawing Sheets

TUNABLE WAVE ENERGY CONVERTER

This application is a continuation-in-part of co-pending application Ser. No. 10/762,800, filed Jan. 22, 2004 now U.S. Pat. No. 7,140,180, titled "Improved Wave Energy Converter (WEC) Device and System", which application claims the benefit of provisional application 60/441,660, filed Jan. 22, 2003, of the same title, the subject matter of both applications being incorporated herein by reference.

BACKGROUND OF THE INVENTION

In co-pending, parent application Ser. No. 10/762,800, there is disclosed a surface wave energy conversion system comprising two separate, but interacting components, each for capturing energy from surface waves.

A first of the system components comprises a generally annular float and the second component comprises an elongated spar float extending through the opening through the annular float. As explained in the parent application, the two floats tend to bob up-and-down in out of phase relation, and the resulting relative movements between the floats are used for driving an energy converter, for example, a linear electrical generator, for generating useful energy. An object of the present invention is to provide means for controlling, at least to some extent, the mechanical impedances of the conversion system for optimizing the efficiency of the energy conversion process.

SUMMARY OF THE INVENTION

In a WEC of the type above described, one or both floats include(s) a hollow space in which is disposed a mass—spring system comprising, for example, a weight suspended from a spring mechanism of selectable spring constant. In use of the WEC, the weight is driven into vertical oscillations in response to the bobbing motions of the host float. The mechanical impedance of the host float is a function of the characteristics of the weight oscillations.

DESCRIPTION OF THE DRAWING

The drawings are schematic and not to scale.

DETAILED DESCRIPTION OF THE INVENTION

Figure 1:
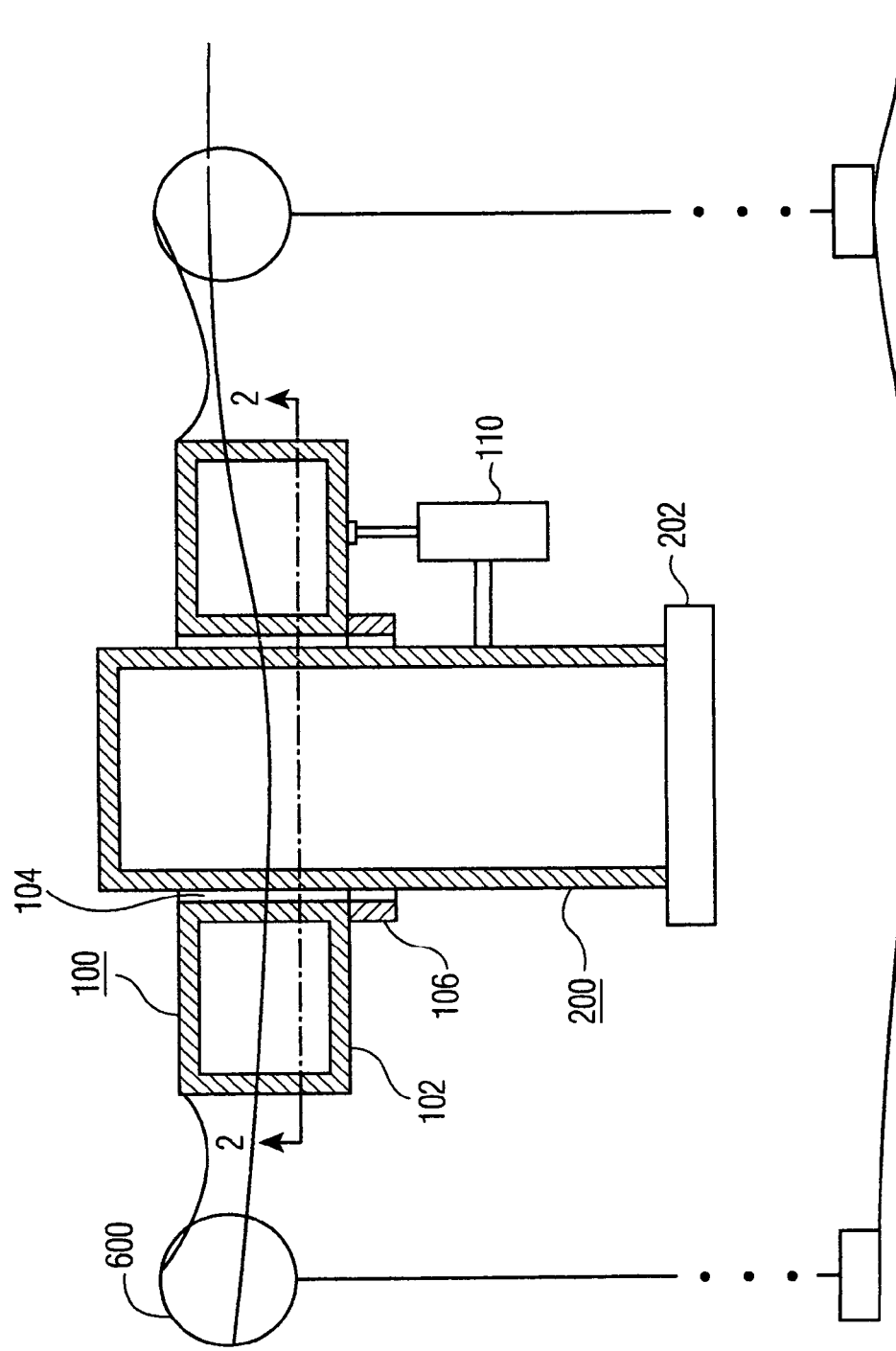
FIG. 1 is a vertical section of a system according to the invention deployed in a body of water.
Figure 2:
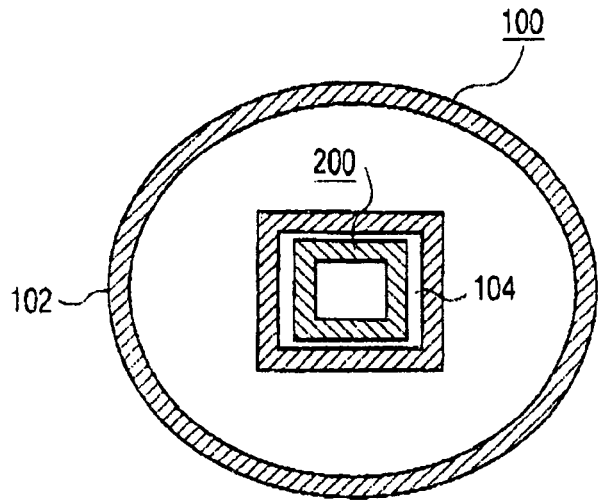
FIG. 2 is a horizontal section taken along line 2-2 of FIG. 1.

One embodiment according to the present invention is illustrated in FIGS. 1 and 2. Therein, two floats 100 and 200 are shown; the float 100 being generally "flat", in the sense of having a relatively large horizontal surface area (at the float interface with the water surface) with a relatively small submerged depth; and the float 200 having a relatively small horizontal surface and a relatively large submerged depth.

The float 100 has an annular shape, including a rim 102 enclosing a central opening 104. The float 200 is elongated and extends through the central opening of the float 100. The physical characteristics of the two floats are selected such that they move generally out of phase with one another in response to passing waves.

The two floats 100 and 200 acquire kinetic energy as they bob up and down in response to the passing waves. One means for extracting energy from the moving floats is to interconnect each float to a separate energy converter, e.g., a hydraulic pump, connected between a respective float and a stationary ground point, e.g., the ocean bed. An advantage of the dual float system of the present invention, however, is that each float can serve as a ground point for the other, with neither float rigidly interconnected to the ocean bed. This is particularly advantageous in deep water situations.

Thus, as shown in FIG. 1, an energy converter, e.g., a hydraulic pump 110, can be interconnected between the two floats with the relative vertical motions of the two floats being used to pump the pump 110 for pressurizing a hydraulic fluid therein. The ability of the two floats to absorb ocean wave energy is dependent on the intrinsic mechanical impedance of each individual float. The intrinsic mechanical impedance for heave motion z can be defined as follows:

$$Z = \frac{F}{V},$$

where F is the heave force acting on the body, and V is the resulting velocity.

For a wave absorber of the type herein disclosed, three different intrinsic mechanical impedances can be defined: $Z_1$, $Z_2$, and $Z_E$, where $Z_1$, and $Z_2$ are the impedances of the floats 100 and 200 (respectively), and $Z_E$ is the impedance of an equivalent single degree of freedom mechanical system. Impedance $Z_1$, is defined as $$Z_1 = \frac{F_1}{V_1},$$

where $F_1$ is the hydrodynamic force acting on float 100 (with float 200 held fixed), and impedance $Z_2$ is defined in an analogous manner. For the case of $Z_E$, a separation velocity $V_E$ can be defined, and a separation force $F_E$ can be determined by solving the coupled equations of motion for floats 100 and 200 for $V_E$ in the special case where there is no power take-off device (PTO) between the floats 100 and 200. Once $V_E$ and $F_E$ are determined, the equivalent mechanical impedance is defined as $$Z_E = \frac{F_E}{V_E}.$$

It can be shown that the equivalent mechanical impedance $Z_E$ can be expressed as follows:

$$Z_E = \frac{Z_1 Z_2 - Z_C^2}{Z_1 + Z_2 + 2Z_C}, \quad \text{Equation 1}$$

where $Z_C = i\omega M_{12} + B_{12}$ is the impedance "cross-term." The coefficients $M_{12}$ and $B_{12}$ are hydrodynamic coefficients known as added-mass and radiation damping terms (respectively.)

It is known that for optimal wave energy conversion efficiency, the PTO impedance $Z_{PTO}$ should be equal to the complex conjugate of the intrinsic impedance. This relation can be written with the following notation: $Z_{PTO}=Z_E^*$. This relation is discussed, for example, in Falnes, *Ocean waves and oscillating systems*, 2002, Cambridge University Press.

The intrinsic impedance $Z_E$ (and hence the optimal PTO impedance $Z_{PTO}=Z_E^*$) may have properties which facilitate—or hinder—the implementation of a power take-off device. As a primary example, the efficiency of any real-world PTO system will decrease as the reactance (complex part) of the PTO impedance increases. This is because the reactive component of the PTO impedance leads to the storage and discharge of energy within the PTO. Since no real-world PTO is perfectly efficient, this energy storage and discharge necessarily leads to loss. A system whose optimal PTO impedance has a minimal reactive component at frequencies of interest may be preferable to a system without this property. There is a point where the imaginary part of the impedance goes from negative to positive infinity. At this so-called "cross-over" point, the required reactance of the PTO force is zero. Because the "cross-over" point represents a wave period where the PTO may act in an optimal manner with minimal reactance, it is advantageous to be able to modify the "cross-over" point.

The present invention is a means to change the intrinsic impedance of one (or both) of the two floats comprising the wave energy converter, so that the intrinsic impedance of the equivalent system takes on preferable characteristics.

Figure 3:
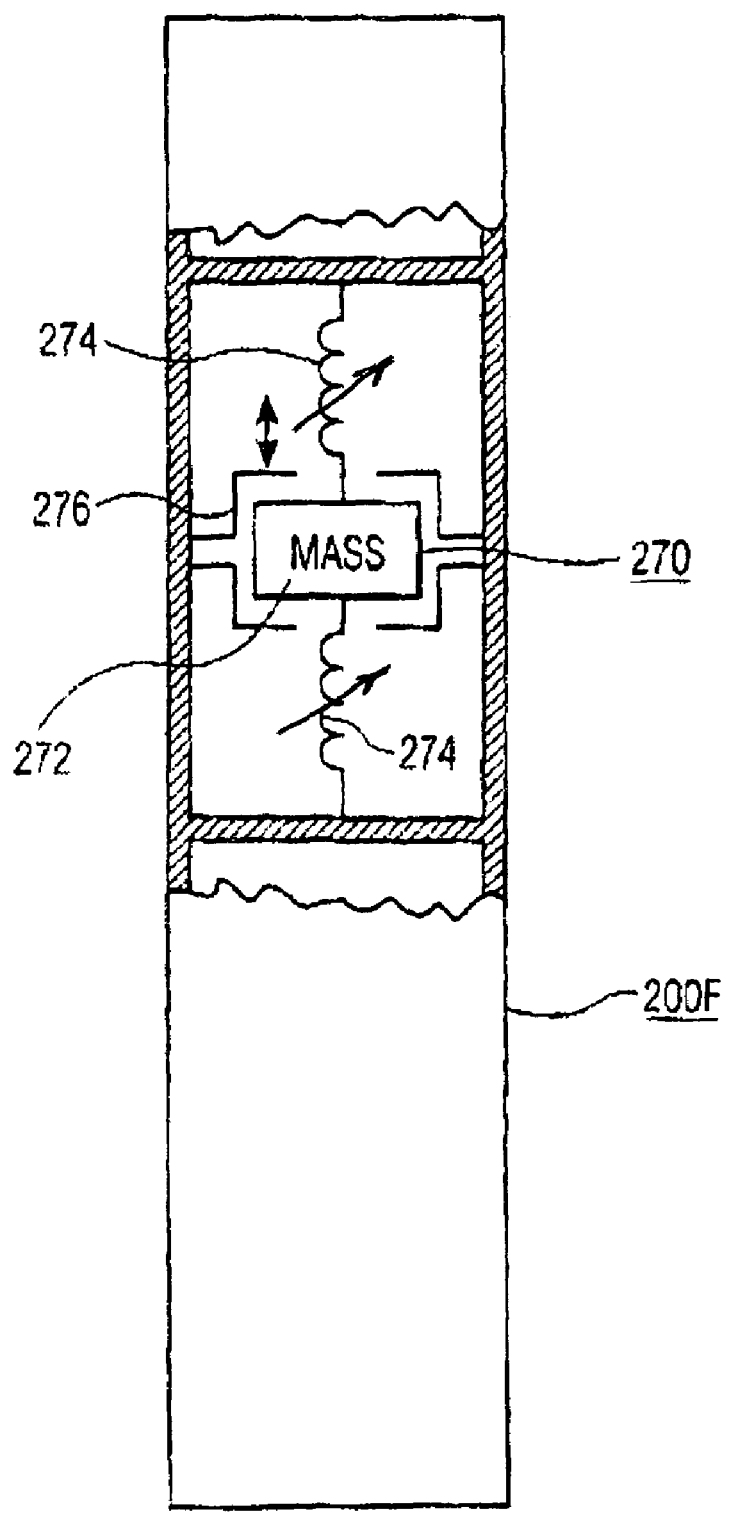
FIG. 3 is a view, partially broken-away with, showing a mass—spring apparatus disposed within one of the floats shown in FIG. 1.

An embodiment of the present invention is shown in FIG. 3. As shown, the float 200F contains within it a mass 270 which is spring mounted by being suspended between a pair of vertically suspended springs 274 of selectively variable spring tension. The variable tension springs can comprise, for example, a known system of hydraulic accumulators.

It can be shown that the impedance of the float 200F in the absence the present invention is given as follows:

$$Z_1(\omega) = i\omega M_1 + R + \frac{1}{i\omega}S, \quad \text{Equation 2}$$

where $\omega$ is the angular frequency, M1 is the mass of the float, R is the linearized damping (consisting of linear radiation damping and possibly linearized frictional effects), and S is the hydrodynamic restoring stiffness.

If the mechanical impedance of the float in the presence of the present invention is defined as $Z_m$, it can be shown that $$Z_m = \frac{i\omega m Z_1 + \frac{1}{i\omega}k(Z_1 + i\omega m)}{i\omega m + \frac{1}{i\omega}k}, \quad \text{Equation 3}$$

where m is the mass 270, and k is the spring constant of the spring 274. This modified mechanical impedance can be used to replace $Z_1$ in Equation 1 to give a new equivalent mechanical impedance $Z'_E$.

$$Z'_E = \frac{Z_m Z_2 - Z_C^2}{Z_m + Z_2 + 2Z_C}, \quad \text{Equation 4}$$

Figure 4:
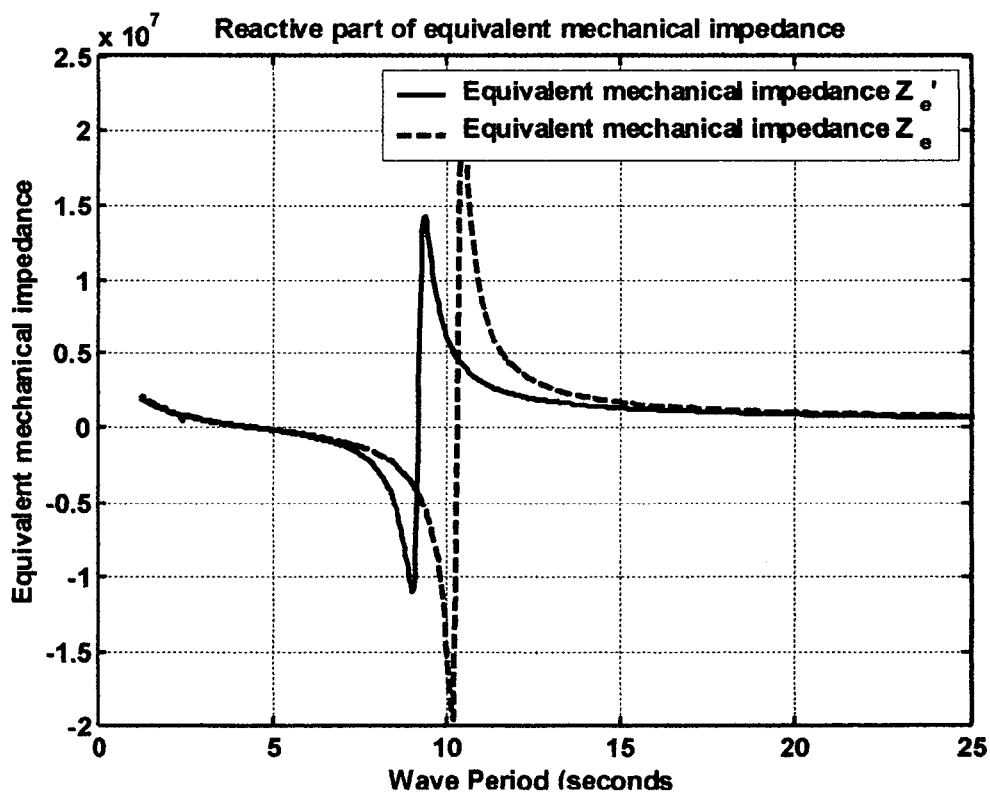
FIG. 4 is a graph showing an example of the type of impedance variations obtainable by the use of the present invention.

By way of example:

For a system comprising a float 200 with mass of 2400000 kg, and not including the present invention, the "cross-over" point may occur at approximately 10 seconds. If an embodiment of the invention is implemented where the size of the mass is 1000000 kg, and the spring constant of the spring weight suspending mechanism is 300 kN/m, the "cross-over" point may occur at approximately 9 seconds. This is shown graphically in FIG. 4, where it is shown that the implementation of this invention has brought the "crossover" point from over 10 seconds to below 9 seconds. For many types of power take off (PTO) it is advantageous to have the period of the "crossover" point coincide with the dominant wave period. Thus, in this example, in a wave climate where the waves can have a dominant period of 10 seconds on one particular day, and 9 seconds on another day, the use of this invention provides a preferred method for tuning the WEC.

The invention claimed is:

1. An apparatus for capturing energy from surface waves on a body of water comprising a pair of floats for out of phase bobbing motions in response to passing waves on a surface of the water body, one of said floats including a weight suspended from a spring mechanism having a selectively variable spring constant for changing the mechanical impedance of said one float in response to changing wave conditions, and an energy converter external to and connected between said floats for generating useful energy in response to said float bobbing motions.

2. An apparatus according to claim 1 wherein the other of said floats also includes a weight suspended from a spring mechanism having a selectively variable spring constant.

3. An apparatus according to claim 1 wherein one of said floats has a generally flat configuration along a horizontal direction and the other of said floats is generally elongated in the vertical direction.

4. An apparatus according to claim 3 wherein said flat float has an annular shape including a central opening, and said other float extends through said opening in sliding relation there with.

5. A method for capturing energy from surface waves on a body of water comprising disposing a pair of floats so configured for out of phase bobbing motions in response to passing waves on a surface of the water body, disposing within one of said floats a weight suspended from a spring mechanism having a selectively variable spring constant for changing the mechanical impedance of said one float in response to changing water conditions, and connecting both said floats to an energy converter external to said floats for generating useful energy in response to said float bobbing motions.

6. A method according to claim 5 including disposing within the other of said floats a weight suspended from a spring mechanism having a selectively variable spring constant for changing the mechanical impedance of said other float in response to changing water conditions.

* * * * *